UNITED STATES PATENT OFFICE.

WALTER K. FREEMAN, OF OSCAWANA, NEW YORK, ASSIGNOR TO HYDROLOSE PROCESS CORPORATION, A CORPORATION OF NEW YORK.

METHOD OF TREATING SULFITE WASTE LIQUOR.

1,175,422.      Specification of Letters Patent.      Patented Mar. 14, 1916.

No Drawing.      Application filed November 25, 1913. Serial No. 803,043.

*To all whom it may concern:*

Be it known that I, WALTER K. FREEMAN, a citizen of the United States, residing at Oscawana, in the county of Westchester and State of New York, have invented certain new and useful Improvements in Methods of Treating Sulfite Waste Liquor; and I do hereby declare the following to be a full, clear, and exact description of the invention, such as will enable others skilled in the art to practice the same.

My invention consists in treating sulfite waste liquor, a waste product of the wood pulp mills, to convert said liquor into new and useful composition of matter, and the subsequent treatment of the composition in various ways, or mixing it with various chemicals or substances to produce other new compositions of matter which may be used in the manufacture of a great variety of articles such as brush backs, buttons, handles, insulators and poker chips differing widely in their character and uses.

In order to understand the principal ingredients of the sulfite waste liquor, and to appreciate the large percentage of wood passing off therein, it may be well to consider briefly the sulfite pulp process for the manufacture of paper, in the course of which this by-product results.

Sulfur is first burned and the gas given off is cooled and passed into a tower in which lime rock is distributed, then water is caused to flow over the surface of the rock dissolving part of the calcium and sulfur dioxid to form bisulfite of lime solution having a percentage of free sulfurous acid. This liquid is then brought into contact with wood chips placed in a closed digester and boiled under a pressure of about sixty pounds, for several hours. The softened wood is then beaten and washed to free it from the chemicals, after which it is bleached, gathered and distributed to the calenders and formed into various kinds of paper. In practice, approximately 40% of the original weight of the dry wood is recovered for use in the manufacture of paper. The remaining 60% of the original dry wood, plus the chemicals, about 300 pounds of sulfur and 200 pounds of lime per ton of wood, pass off in the sulfite waste liquor. It is apparent, therefore, that more of the wood content is lost, in making paper pulp, than is recovered. It is also apparent that only the stronger and more matured cellulose constituents can withstand this treatment without being dissolved, so that all of the original wood other that the matured cellulose is lost and goes off with the chemicals and water to make up this sulfite waste liquor. The lost part of the original wood consists of the primitive lignin-cellulose, the primitive and formative cells, protoplasm, resins and other secretions of the wood and such of the matured cells as have been dissolved in the process of digestion. The yearly loss to paper manufacturers from this large percentage of wasted wood amounts to millions of dollars, and aside from this enormous loss, the sulfite waste liquor, on account of its offensive odor, has been a nuisance to manufacturers, and its poisonous and acrid ingredients cause such serious pollution of the streams into which it is emptied that it has become a subject of legislation in some States.

Certain of the chemical elements found present in this sulfite waste liquor, among which are the spent bisulfite of lime and the sulfurous acid, prevent the solids of the waste liquor from entering into combination with other chemicals to form any composition or compound useful for any purpose now known.

By my method of treating sulfite waste liquor, I am enabled to eliminate from the liquor those elements that prevent the solids therein from entering into chemical combination or mixture with other substances to form useful compositions of matter.

In carrying out my invention, I first add a basic reagent to the liquor and then add a suitable precipitant to convert the remaining sulfurous compounds, preferably to inert solids; after which the resulting substantially neutral syrup with or without the precipitates may be bleached, evaporated down to an anhydrous mass, and ground into a powder. This powder may then be mixed with a suitable oxy-chlorid bond such as magnesium oxid and chlorid or any other suitable oxy-chlorid bond, and ground therewith into a powder from which numerous fire-proof and moisture-proof articles of varying hardness and elasticity may be made, with or without other ingredients.

I have found in practice that the method of treating the sulfite liquor in accordance with my invention may be varied at different steps in the process, and that certain ingredients in the waste liquor may be recovered during the method of treating the same to obtain the composition of matter which is one of the objects of this invention; but in order to aid those skilled in the art in a thorough understanding of the invention and the manner of practising the same, I will set forth in detail what I believe to be the most efficient manner of treating the waste liquor for the purpose intended.

I first run the sulfite waste liquor into an acid resisting tank, where the liquor is partially evaporated to increase its density so as to economize in the amount of chemicals with which the liquor is subsequently treated. I have found in practice that for the best results the liquor should first be evaporated down to about 20% to 30% of solids. The resulting liquor is then run into a beater where it may be partially cooled, after which a sufficient amount of a suitable reagent is added. The object of allowing the syrup to partially cool before adding the reagent is to prevent the vaporization of a considerable portion of the volatile element of the agent which would occur if the temperature were kept too high. I have found some chloridifying agent such as hydrochloric acid a very satisfactory agent in the present connection. Boiling accelerates the reaction. The acid seizes upon and coagulates certain substances, possibly albuminoids, present. The hot semi-solid or syrupy liquor is then beaten while the temperature is maintained at approximately 200° Fahr. until there are indications of separation of the solids from the water element. The syrupy substance is then drawn into a settling tank preferably provided with an air or mechanical agitator, where it is allowed to rest for several hours until separation is evidenced, and when at a temperature of about 100° Fahr., a small percentage of a suitable reagent such as ammonia or an ammonia compound is added and the mixture agitated for a length of time sufficient to thoroughly mix and distribute the ammonia throughout the mass to cause precipitation of the insoluble compounds formed.

When it is desired to separate the wood derivatives or constituents from the precipitates thus formed, the entire mixture, including the precipitates, is run into a comparatively deep settling tank where the precipitates are allowed to settle and the syrupy part of the mixture containing the wood derivatives is then drawn off. The resulting composition is practically black, and hence any derived product would not be suitable for the manufacture of light colored articles without first bleaching the composition to remove the furfural of coloring matter therefrom. In doing this I preferably cool the syrup down to approximately normal temperature and bleach the same by any suitable process such as the electrolytic ozone process, or by chlorin gas, or by direct electrolytic action, during which step further precipitates are formed and a furfural scum rises, all of which may be separated from the liquor, leaving a composition of lighter color, the shade or tone of which may be governed by the degree of bleaching.

After bleaching the composition, if bleaching is desired, I run the bleached syrup composition into an evaporating chamber preferably provided with a vacuum arrangement to facilitate drying at a lower temperature, and in this chamber I evaporate the syrup composition down to approximately 80 to 90 per cent. of solids. The resulting composition is a mass which may then be reduced to powder and shipped in suitable containers. For the sake of convenience in hereafter referring to the new neutralized derivative of the sulfite waste liquor, whether in the partially evaporated or the dry state, bleached or unbleached, and with the neutralized chemicals separated from or remaining mixed with the wood constituents, I shall designate the same as "xylium."

After precipitation has taken place as above set forth, the syrupy mass which is drawn off or separated from the precipitates, contains the wood derivatives which consist of the primitive lignin-cellulose, the primitive and formative cells, protoplasm, and resins and other secretions of the wood and such of the matured cells as have been dissolved in the process of digestion. For the sake of convenience, in referring to this new composition of matter, I will designate the same as "xylozo." The term is to designate this new composition of matter in any form, whether in the syrupy semi-solid state, bleached or unbleached, or after being evaporated down to an anhydrous mass and reduced to powder.

The inert precipitate or insoluble solids from which the syrupy mass is drawn off or separated, contains the spent chemical compounds of the sulfite waste liquor such as the sulfur, calcium compounds, and this precipitate may be ground up and used with suitable mixture for roofing and other purposes. When these precipitated or neutralized chemical compounds remain mixed with the wood derivatives in the neutral mixture or mass, I have decided, for the sake of convenience, to hereafter refer to such mixture or composition of matter whether in the syrupy semi-solid, or dry state, bleached or unbleached as "xylosca."

If the anhydrous mass is to be used in the manufacture of large articles or in coarser work, the syrupy substance need not be allowed to stand to facilitate precipitation, since the chemical compounds distributed through the liquor need only be reduced to neutral inert substances, in which the entire syrupy mixture, including the neutralized inert substances, may be evaporated down to an anhydrous mass after or without bleaching.

The three words, "xylium," "xylozo" and "xylosca" are derivatives of the Greek word xylon meaning "wood." I believe them to be appropriate terms by which the new compositions of matter may be designated, the first being the genus and the others the species.

If desired, the powdered "xylium" may be mixed with suitable proportions of a suitable dry metallic oxid such as dry magnesium oxid, and the two reduced to a powdered form, or the "xylium" may be mixed with a suitable amount of a dry metallic oxid and chlorid such as magnesium oxid and chlorid and ground up to form a powder. Other oxy-chlorids such for instance as zinc, barium, aluminum or platinum, oxids and chlorids, may be substituted for the magnesium oxid and chlorid. The powder may be used alone or with other ingredients, and when moistened with water may be used to form various fireproof and resistant articles of varying hardness and elasticity.

It is immaterial to my broad invention whether the recovered by-product "xylium" is broken up and ground together with the metal oxid alone having a suitable amount of a chlorid solution added at the time that powder is to be used, or whether it is broken up and ground with the oxid and chlorid in one operation to form the resulting powder. The oxy-chlorid bond and the resulting composition may be mixed in any suitable manner so long as the three ingredients are brought into intimate contact to bring about the proper chemical action to form the desired result.

In practice, I have found that it is preferable to reduce the mass to a fine powder, and then thoroughly mix this powder with a substantially equal part by weight of dry powdered magnesium oxid and a half part by weight of dry powdered magnesium chlorid to form the resulting composition. The method of mixing these ingredients in practice, and whether the metal chlorid is to be ground in with the metal oxid or added lather as a chlorid solution, will depend entirely upon the facilities and convenience to the manufacturer.

The "xylosca" or "xylozo" oxy-chlorid powder may be mixed in a suitable manner with fibrous material and other ingredients properly treated, from which mixture plasterboards, etc., may be made. These boards are practically fireproof and moisture-proof and have the desired degree of elasticity to receive and hold nails and to withstand various uses. The "xylosca" or "xylozo" oxy-chlorid powder may likewise be mixed with different ingredients and suitably treated to form a flooring composition which is fireproof, less affected by moisture than "cement," and which has a degree of elasticity which will permit it to be cut or drilled without cracking, which makes it more suitable for flooring.

I have found in practice that the "xylium" powder, by being suitably treated by different processes, may be used in the manufacture of molded articles, such as billiard balls, lasts on which rubbers may be vulcanized, insulating articles for electrical apparatus, or for picture-frames and fresco work; and it is better suited for the manufacture of these articles and much cheaper than anything now on the market for such purposes. I have also found this powder useful in making a composition useful as lithographers' stone, and which has valuable qualities as such. I have found in practice that the articles which may be made from this powder and which have highly useful qualities, range from translucent glass-like substances down to flooring.

The syrupy "xylozo" containing as it does in solution, the primitive lignin-cellulose, resin, oils, protoplasm and primitive cells, when bleached, may be used in the manufacture of soap. I have found in practice that a very fine quality of soap may be easily and very economically made from this syrupy "xylozo." I have also found that the syrupy "xylozo" may be readily treated to form a compound which may be used as an ingredient in making water colors which have the character of retaining their color in a measure unknown in any of the colors now on the market.

A somewhat different method which I regard as within the bounds of my broad invention of treating sulfite waste liquor to form "xylium" is disclosed and claimed in my companion application of even date herewith Serial No. 803,044, and briefly consists as follows: Instead of the hydrochloric acid and ammonia of the process disclosed above, I may use as the first reagent a halogen compound of an alkali metal such as sodium chlorid, and for the precipitating agent I may use a halogen compound of an alkali earth metal such as barium chlorid as is disclosed in my companion application Serial No. 803,044

After this disclosure of my broad invention of the recovery of the wood derivatives and chemical constituents of the sulfite waste liquor of wood pulp mills, changes in the method of recovery and substitutions in the ingredients used may possibly suggest themselves to those skilled in the art, and I do not wish to be understood as limiting myself to the recovery of the wood derivatives and chemical ingredients from waste liquor resulting from any particular process, since I believe it to be broadly new with me to recover, in the manner indicated separately or mixed, the wood derivatives and the chemical ingredients of sulfite waste liquor.

Having thus described my invention, what I claim as new and desire to secure by Letters Patent is:

1. The method of treating sulfite waste liquor from wood pulp mills, which consists in concentrating said waste liquor, then in treating said waste liquor with hydrochloric acid, agitating, and adding ammonia to separate the lignin-cellulose constituents from the spent sulfurous acid ingredients of said liquor.

2. The method of treating sulfite waste liquor from wood pulp mills, which consists in concentrating said waste liquor, then in adding hydrochloric acid and agitating while hot, allowing the resulting substance to partially cool, adding ammonia and beating, and allowing the resulting substance to stand or settle to precipitate the sulfur and calcium compounds of said liquor.

3. The method of treating sulfite waste liquor from wood pulp mills, which consists in concentrating said waste liquor, then in adding thereto hydrochloric acid and boiling, then adding ammonia and bringing the same into intimate contact with the constitutents of the liquor, and allowing the resulting mass to settle to effect precipitation.

4. The method of treating sulfite waste liquor from wood pulp mills, which consists in concentrating said waste liquor, then in adding hydrochloric acid and boiling, then allowing the liquor to partially cool, adding ammonia and beating to bring the ammonia into contact with all the components of the liquor to neutralize the same and form inert substances, and then evaporating the resulting mixture.

5. The method of treating sulfite waste liquor from wood pulp mills, which consists in partially evaporating the liquor and adding hydrochloric acid and boiling the liquor, partially cooling the liquor and adding ammonia and agitating to further convert the sulfur calcium compounds into inert substances.

6. The method of treating sulfite waste liquor from wood pulp mills, which consists in concentrating said waste liquor, then in adding hydrochloric acid and boiling to form a precipitate the cooling liquor and adding ammonia in excess and beating, and then allowing the resulting syrupy mass to stand, whereby the sulfur, calcium and acid ingredients are separated from the wood derivatives of the liquor.

7. The method of treating sulfite waste liquor from wood pulp mills, which consists in concentrating said waste liquor, then in adding hydrochloric acid to said liquor while hot, partially cooling the liquor and adding ammonia in excess and beating, then allowing the resulting mass to stand to cause further reaction to effect precipitation of the sulfur compounds of the liquor.

8. The method of treating sulfite waste liquor from wood pulp mills, which consists in concentrating said waste liquor, then in adding hydrochloric acid to said liquor while heated, partially cooling the liquor and adding ammonia in excess and beating, then allowing the resulting mass to stand to cause further reaction and effect precipitation of the liquor, and then drawing off the substance containing the wood derivatives from the precipitates, and evaporating said mass down to an anhydrous mass.

9. The method of treating sulfite waste liquor from wood pulp mills, which consists in concentrating said waste liquor, then in adding hydrochloric acid and then adding ammonia to fix the sulfur compounds of the liquor and form inert substances.

10. The method of treating sulfite waste liquor from wood pulp mills, which consists in partially evaporating the liquor and then adding hydrochloric acid and agitating to convert the sulfurous acid ingredients distributed through the liquor into substantially neutral inert substances.

In testimony whereof I affix my signature in the presence of two subscribing witnesses.

WALTER K. FREEMAN.

Witnesses:
 JNO. S. GEORGE,
 CLARENCE W. HODGE.